INVENTOR.
Jaroslav Slechta

[United States Patent Office — 2,996,122 — Patented Aug. 15, 1961]

2,996,122
AUTOMATIC CYCLIC PITCH CONTROL MECHANISM FOR ROTOR BLADES OF HELICOPTER AIRCRAFT

Jaroslav Šlechta, Prague, Czechoslovakia, assignor to Vyzkumny a zkusebni letecky ustav, Letnany, near Prague, Czechoslovakia
Filed Nov. 20, 1958, Ser. No. 775,291
Claims priority, application Czechoslovakia Nov. 29, 1957
2 Claims. (Cl. 170—160.25)

The present invention relates to an automatic cyclic pitch control mechanism for rotor blades of helicopter aircraft, and more particularly to a modification and improvement of the mechanism disclosed in my earlier Patent No. 2,611,441.

The system of rotating blades forming the rotor of a helicopter receives energy for rotation either from the engine or from an air stream passing over the blades. The first condition is referred to as engine flight, the second condition as autorotative flight. The two conditions result in a different direction of the torque exerted by the engine and the air stream upon the rotor shaft. If the torque transmitted to the rotor shaft from the engine during engine flight is positive, namely driving torque, the torque transmitted to the rotor shaft by the forces of the air stream is negative, or braking torque. During autorotative flight, the rotor is braked by a negative torque resulting from the frictional resistance of the idling transmission gears, of the rear screw and the like, and this torque is overcome by the positive or driving torque of the rotor blades resulting from the air stream.

The blades of a helicopter rotor are individually pivoted on drag hinges which are parallel to the rotor axis so that the simultaneous action of the centrifugal force caused by rotation of the rotor, and of the tangential force which is due to the aerodynamic resistance of the rotor blades, causes the blade axis to deviate from a radial position relative to the rotor shaft by a certain angle. For safety reasons it is advisable that the speed of the rotor should remain as uniform as possible under all flight conditions. The centrifugal force exerted on the blades will thus be approximately uniform, and a change of the torque in the shaft due to changes of the aerodynamic forces exerted on a blade in the plane of rotation results automatically in a change of the deviation angle of the rotor blade axis during engine flight as well as during autorotative flight.

This automatic movement of the blades in the plane of rotation is being used according to the present invention to cause automatic adjustment of the blades for autorotative flight in the case of sudden engine failure. If the engine fails during hanging or at relatively high flight speeds, when the rotor blades are operating at a relatively great pitch, the pilot must reduce the motor blade pitch immediately, and usually within two seconds to prevent a sudden and dangerous loss of rotating speed, and to maintain the aircraft in autorotative gliding flight.

Hitherto known devices for automatic adjustment of the blade pitch for autorotative flight mostly employ centrifugal regulators, or they take advantage of the deviation of the axis of the universal joint suspension of the rotor blades. These arrangements are however complicated, expensive, and sometimes not very reliable.

In accordance with this invention, the fundamental properties of the eccentric cyclic pitch control system disclosed in my aforecited patent are used to achieve the primary object of this invention. Since the movements of the control elements of this eccentric cyclic pitch control of the rotor blades occur in a plane perpendicular to the rotor shaft automatic adjustment of the blades can be achieved by coupling a control element in a suitable way with the rotor blade.

It is thus the object of this invention to provide a simple and reliable automatic pitch control system in conjunction with an eccentric pitch control system, which permits easier transition from normal engine flight to autorotative flight.

Other objects and features of this invention will be more fully understood from the following specification with reference to the accompanying drawings, which illustrate a preferred embodiment of the invention. The same reference characters indicate the same or equivalent parts in all figures, of which:

Figure 1:
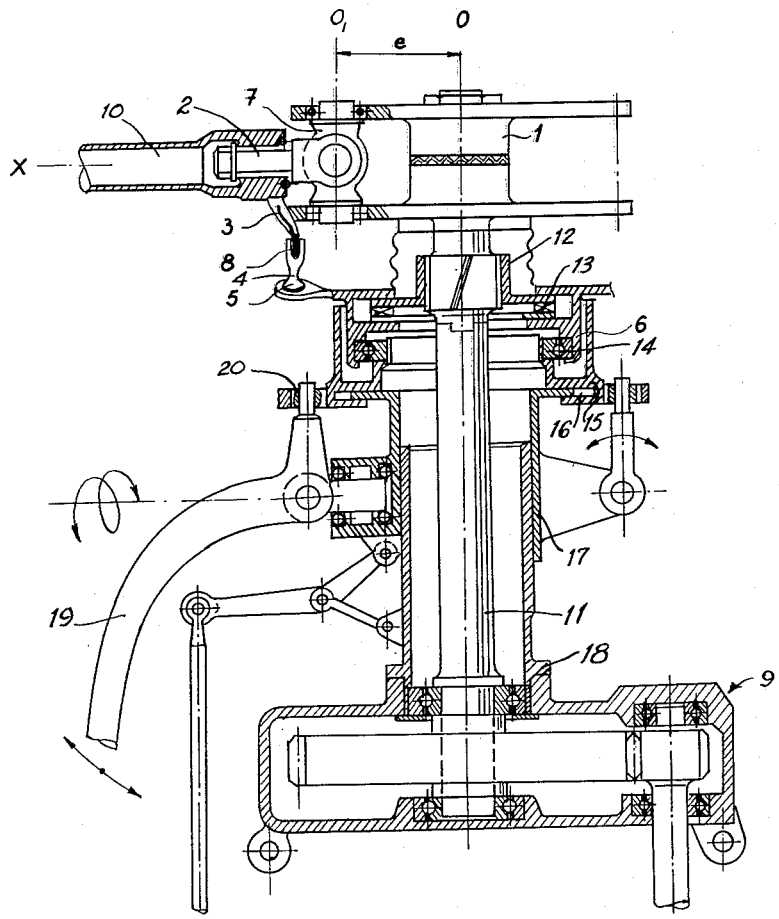
FIG. 1 shows a fragmentary axial section of a rotor hub.

As shown in FIG. 1, a rotor shaft 11 is driven by an engine (not shown) by means of a gear transmission 9. The rotor shaft 11 carries a rotor hub 1 on which the blade shafts 2 are suspended by universal joints 7. A rotor blade 10 is journaled on each of the shafts 2 and is free to rotate about its longitudinal axis X. Only one blade is shown for the sake of clarity. Control levers 3 are fixed to the blade 10 and have free ends which are provided with eyelets 8. Actuating rods 4 engage the eyelets 8 and connect the levers 3 to suspending eyelets 5 of the outer member 6 of an eccentric cyclic pitch control mechanism of the kind described in my Patent No. 2,611,441.

The eccentric cyclic pitch control mechanism consists essentially of three members which rotate with the shaft 11, namely an inner driving member 12, an intermediate coupling member 13, and an outer control member 6. As shown in more detail in my aforecited patent, the intermediate member 13 is slidably supported in the driving member 12 for radial movement. The outer member 6 is similarily slidably supported in the intermediate member 13 for movement at right angles to the direction of sliding movement of the intermediate member. The outer member 6 is rotatingly supported by a bearing with antifriction elements 14 within a casing 15. The casing 15 is displaceable in a plane perpendicular to the axis of the rotor shaft 11 to vary the eccentricity of the outer member 6 relative to said axis.

The casing 15 is formed with a slot 16 which is slidably engaged by a flanged member 17 mounted on the stationary housing 18 of the rotor shaft 11. Radial movement of the casing 15 is actuated by a bell crank lever 19 which is pivoted on the housing 18 and is movably linked to the casing 15 by a spherical joint 20.

It will be understood that the outer member 6 guided by the bearing elements 14, and the intermediate member 13 while rotating with the inner member 12 and the rotor shaft 11 will perform a radial reversing motion relative to the axis of rotor shaft 11, the magnitude of this radial motion being equal to the eccentricity of the outer member 6 which may be varied by adjusting the position of the casing 15 relative to the axis of the rotor shaft. As best seen from FIG. 2, the center of the eyelet 8 is radially offset by the distance $i$ from the vertical axis $O_1$ of the universal joint 7. The axes $O_1$ and $O_2$ respectively of the universal joints 7 of two diametrically opposite rotor blades 10 in the rotor hub 1 are equally spaced from the axis O of the rotor shaft by the distance $e$.

Figure 3:
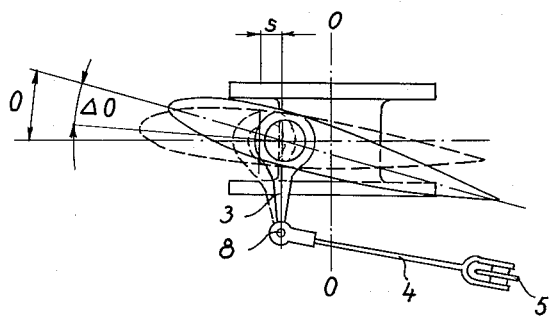
FIG. 3 is a schematic elevational view of the apparatus of FIG. 2.

The eccentricity and angular position of the outer member 6 of the eccentric cyclic pitch control mechanism with respect to the rotor shaft may be changed by means of manual control levers operated by the pilot. During stable flight conditions the rotor blades are distributed uniformly within the plane of rotation so that their longitudinal axes defines an angle $\gamma$ with a straight line connecting the axis O of the rotor shaft and the axes $O_1$ and $O_2$ of the universal joints 7. The deviation angle $\gamma$ changes during forward flight in accordance with the aerodynamic torque on the rotor shaft. Because of the offset $i$ the center of the eyelet 8 from the vertical axis $O_1$ of the universal joint 7 and its connection by the rod 4 with the outer member 6 of the eccentric cyclic pitch control mechanism, any change of the deviation angle $\gamma$ causes simultaneously a change of the pitch of the rotor blade. The trend of this change is such that for a decreasing torque on the rotor shaft, the angle of the pitch of the rotor blade decreases. In the event of engine failure the deviation angle $\gamma$ changes immediately without the intervention of the pilot. As is best seen from FIG. 3, the control lever 3 of the rotor blade 2 can actuate an automatic change in the pitch of the rotor blade in the direction required for a smooth change-over to autorotative flight conditions. By choosing the off-set $i$, the spacing $e$ of the axis of the universal joints 7 of the rotor blades, and the length of the control lever 3, the magnitude $\Delta\theta$ of the automatic change of the blade pitch $\theta$ as a function of the torque of the rotor shaft may selected at will.

Figure 2:
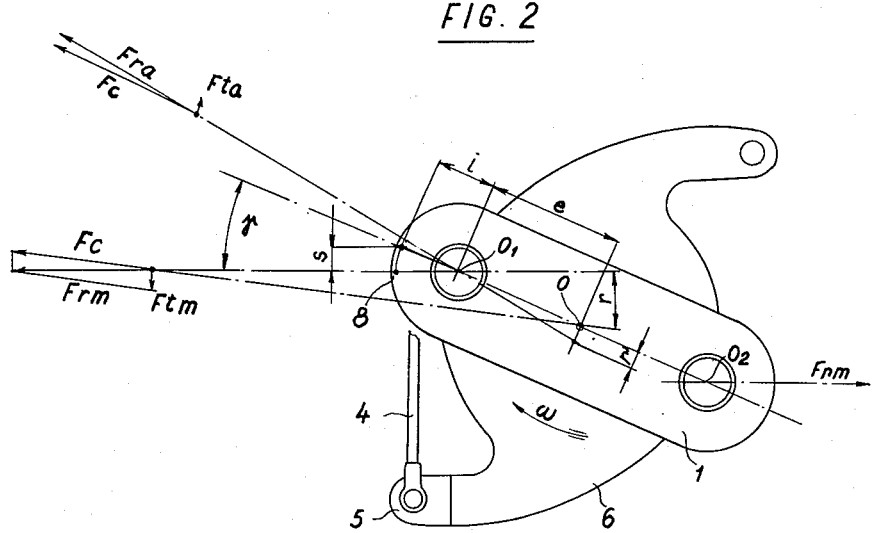
FIG. 2 is a schematic top view of the device of FIG. 1.

FIG. 2 shows the conditions for equilibrium of the forces acting upon the blade approximately at its center of gravity under the two characteristic flight conditions, namely those of autorotative flight and of engine flight respectively. It is seen, that the centrifugal force $F_c$ and the tangential force $F_{ta}$ which act upon the blade during autorotative flight will align the axis of the blade with the resultant force $F_{ra}$. During engine flight, the axis of the blade will be aligned with the force $F_{mr}$ which is the resultant of the centrifugal force $F_c$ and the tangential force $F_{tm}$. To enable transmission of the torque from the rotor shaft 11 to the hingedly suspended rotor blade during engine flight and in the opposite direction during autorotative flight, it is necessary that the axes $O_1$, $O_2$ of the universal joints 7 of the rotor blades 2 be eccentrically spaced the said distance $e$ from the axis O of the rotor shaft. Because of the eccentric spacing of the axes $O_1$ and $O_2$, the forces $F_{ra}$ and $F_{rm}$ create torques with respect to the rotor shaft, the magnitude of the torques being equal to $F_{ra} \cdot r'$ and $F_{rm} \cdot r$ respectively, the terms $r$ and $r'$ respectively indicating the perpendicular distance of the rotor shaft axis O from the longitudinal blade axis under conditions of engine flight and autorotative flight respectively. The direction of the torque applied to the rotor blade and rotor shaft is determined by the direction of the tangential forces $F_{ta}$ during autorotative flight and $F_{tm}$ during engine flight respectively.

The automatic change of pitch towards autorotative flight conditions produced by the mechanism of the invention extends the safely permissible duration of the critical period, within which the pilot must complete the pitch change for autorotative flight in the event of engine failure.

A substantial improvement in the safety of helicopter aircraft operation is thus achieved.

What I claim is:

1. In a pitch control arrangement for helicopters, the combination of an engine driven rotor shaft rotatable about its longitudinal axis, a rotor hub mounted on said shaft for rotation therewith, pivot means on said hub spaced radially from said axis, an elongated rotor blade mounted on said pivot means for lagging and flapping movement and for pitch varying turning relative to the hub, a control member mounted on said shaft below said hub for rotation with the shaft in a radial plane about a center of rotation which is spaced radially from said axis of rotation of the shaft, said control member having a portion which undergoes a cyclic radial reversing motion during rotation with said shaft, an arm depending from said blade at a location along the latter spaced from said pivot means and from said axis of rotation of the shaft, and link means connecting the lower end of said arm with said portion of the control member to convert said cyclic radial reversing motion into a cyclic variation in the pitch angle of said blade while automatically reducing the pitch angle of the blade for auto-rotation in response to the lagging movement of said blade about said pivot means as a result of failure of the engine drive for said shaft.

2. In a pitch control arrangement for helicopters, the combination as in claim 1; wherein said portion of the control member to which said link means is connected is in trailing relation to said blade considered with respect to the direction of rotation of said shaft.

References Cited in the file of this patent

UNITED STATES PATENTS

| | | |
|---|---|---|
| 1,986,709 | Breguet | Jan. 1, 1935 |
| 2,415,148 | Sikorsky | Feb. 4, 1947 |
| 2,429,646 | Pullin | Oct. 28, 1947 |
| 2,611,441 | Slechta | Sept. 23, 1952 |